(12) United States Patent
Wellbrook et al.

(10) Patent No.: US 8,751,069 B2
(45) Date of Patent: Jun. 10, 2014

(54) DYNAMICALLY RECONFIGURABLE ELECTRICAL INTERFACE

(75) Inventors: Gregory M. Wellbrook, Long Beach, CA (US); Charlie Wang, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 13/162,260

(22) Filed: Jun. 16, 2011

(65) Prior Publication Data

US 2012/0323409 A1 Dec. 20, 2012

(51) Int. Cl.
*H03M 1/04* (2006.01)

(52) U.S. Cl.
USPC ...... 701/3; 701/1; 701/46; 701/104; 701/123; 307/39; 307/116; 307/126; 307/131

(58) Field of Classification Search
CPC ............ H02J 9/005; B64D 2045/0055; B64D 45/0015; B64D 2045/0035; B64D 2045/0045; H03M 1/00
USPC .............. 701/1, 3, 46, 104, 123; 307/39, 116, 307/126, 131
See application file for complete search history.

(56) References Cited

U.S. PATENT DOCUMENTS

| 5,036,465 | A | * | 7/1991 | Ackerman et al. | ............. 235/400 |
| 5,091,847 | A | * | 2/1992 | Herbermann | ...................... 714/3 |
| 5,453,744 | A | * | 9/1995 | VanDeusen et al. | .......... 341/155 |
| 6,362,768 | B1 | * | 3/2002 | Younis et al. | ................. 341/155 |
| 6,615,116 | B2 | * | 9/2003 | Ebert et al. | .......................... 701/3 |
| 6,684,347 | B1 | * | 1/2004 | Coffey | ............................. 714/43 |
| 6,941,850 | B1 | * | 9/2005 | McMahon | ................... 89/1.811 |
| 7,864,689 | B2 | * | 1/2011 | Chan | .............................. 370/248 |
| 8,077,065 | B2 | * | 12/2011 | Iso et al. | ........................ 341/139 |
| 2003/0033059 | A1 | * | 2/2003 | Ebert et al. | ......................... 701/3 |

(Continued)

FOREIGN PATENT DOCUMENTS

| EP | 1494416 A2 | 1/2005 |
| WO | 0111478 A1 | 2/2001 |
| WO | 0215528 A1 | 2/2002 |

OTHER PUBLICATIONS

International Search Report & Written Opinion dated Aug. 3, 2012 in PCT Application No. PCT/US12/38209.

(Continued)

*Primary Examiner* — John R Olszewski
*Assistant Examiner* — Truc M Do
(74) *Attorney, Agent, or Firm* — Hope Baldauff, LLC

(57) ABSTRACT

A dynamically reconfigurable electrical interface is disclosed that can be used in various applications, including avionics communications. In one embodiment, a first switch receives an input signal and routes it to the applicable signal conditioning path unit that conditions the input signal, after which a second switch routes it to an amplifier. The amplifier provides an amplified signal to an analog-to-digital converter that generates a corresponding numerical value based on the voltage of the amplified signal that is analyzed by a processor to determine information conveyed by the input signal based on a particular electrical interface. Multiple distinct interfaces can be accommodated by on one more processors accessing instructions sets for processing information corresponding to a particular electrical interface. In another embodiment, the processor provides numerical values to a digital-to-analog converter producing an analog signal that is amplified, routed, and conditioned to convey information using a particular electrical interface.

18 Claims, 8 Drawing Sheets

(56) References Cited

U.S. PATENT DOCUMENTS

| | | | |
|---|---|---|---|
| 2005/0018371 A1* | 1/2005 | Mladenik et al. | 361/78 |
| 2007/0032266 A1* | 2/2007 | Feher | 455/553.1 |
| 2010/0217899 A1* | 8/2010 | Sitzmann et al. | 710/69 |
| 2010/0245140 A1* | 9/2010 | Iso et al. | 341/120 |
| 2011/0081152 A1* | 4/2011 | Agazzi et al. | 398/135 |
| 2012/0062403 A1* | 3/2012 | Iso et al. | 341/139 |

OTHER PUBLICATIONS

"ARINC 429" Wikipedia: http://en.wikipedia.org/wiki/ARINC_429; accessed Jun. 16, 2011.

"MIL-STD-1553" Wikipedia: http://en.wikipedia.org/wiki/MIL-STD-1553; accessed Jun. 16, 2011.

"RS485 serial information" http://www.lammertbies.nl/comm/info/RS-485.html; Nov. 2010.

* cited by examiner

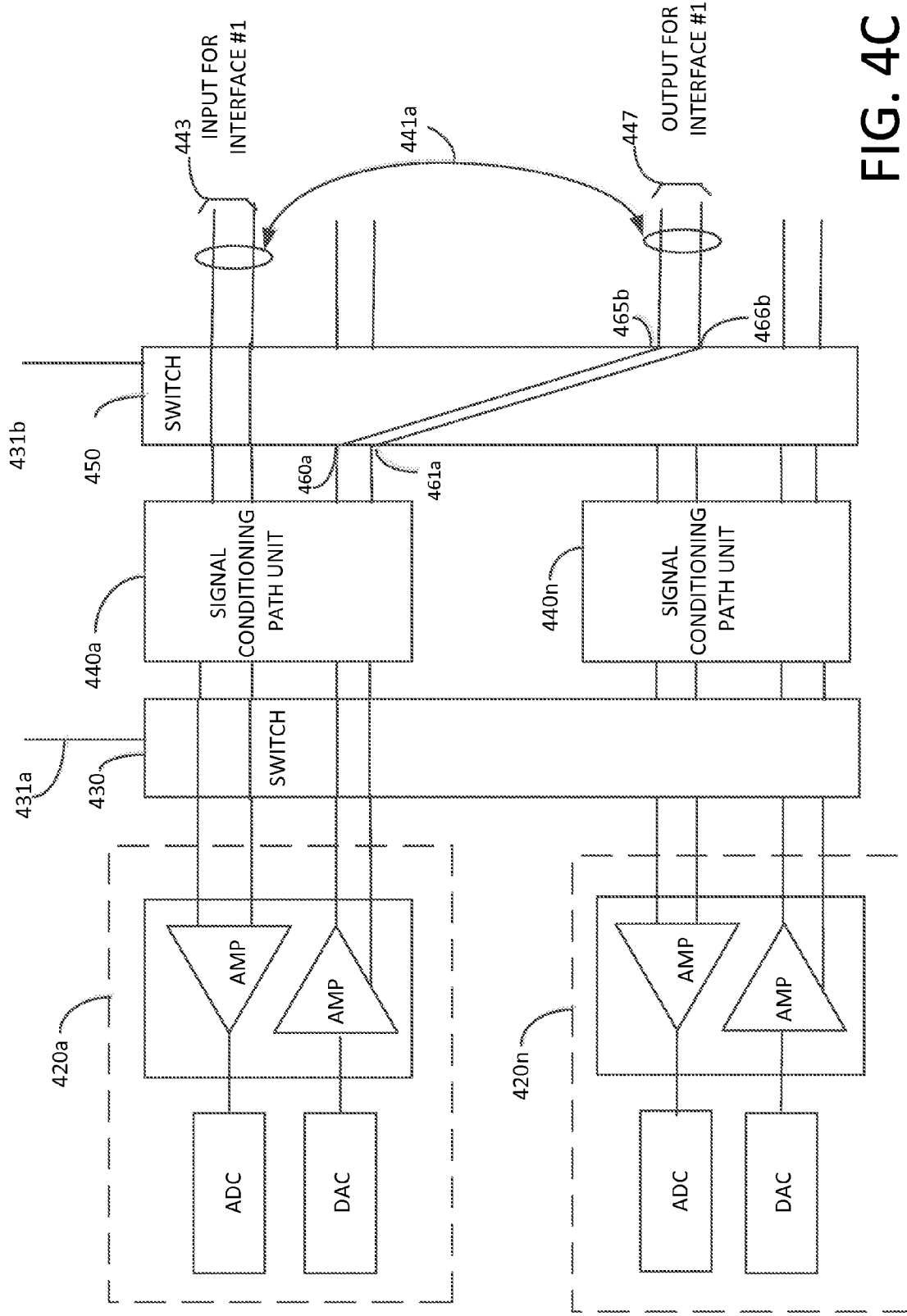

DYNAMICALLY RECONFIGURABLE ELECTRICAL INTERFACE

BACKGROUND

Commercial and military aircraft comprise various electronic systems (often called "avionics") that collect data and communicate information to other components during normal operation of the electronic systems. Such avionics may include flight management computers, entertainment systems, computers, radios, sensors, and GPS related equipment. Typically, standardized communication electrical interfaces that define the communication protocols for signaling are used to facilitate interconnection and communication between the various components.

Various electrical interfaces have been defined to facilitate interconnection between such components. Such interfaces may include, for example, ARINC-429 that is a technical standard for avionics data communications, and defines a physical and electrical interface for a serial data bus and associated protocol. Other avionics standards include MIL-STB-1553B that is a serial data bus interface often used on military aircraft. Other avionics on a commercial passenger plane, such as in-flight video entertainment components, may involve communication and processing of digital video signals. Other aircraft components may use other serial data interfaces, including the Electronics Industry Association ("EIA") EIA-232 standard, the EIA-422 standard, and EIA-485 standards. Other electrical interfaces may be encountered in subsystems in an aircraft, such as the Universal Serial Bus ("USB") that are prevalent on personal computers.

While dedicated integrated circuits ("chips") may be available to implement these various communication interfaces, the resulting components are still limited to the interfaces provided by the chip. Incorporation of a new or updated interface may require incorporating new hardware and software to control a new chip. Prior to production of such components, each interface-specific chip, and the component it is incorporated into, must be tested, accepted, and designed into modules, before they can be accepted for use into commercial or military aircraft. An airplane may have numerous distinct electrical interfaces, and this may increase the complexity in maintaining the components used for each type of interface or system.

A flexible approach for accommodating various electrical interfaces would mitigate these aspects. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment of the disclosure, a dynamically reconfigurable electrical interface ("DREI") is provided for processing received interface signals. The DREI includes a first switch, a signal conditioning path unit, a second switch, an amplifier, an analog to digital converter ("ADC"), and a processor. The first switch receives the input signal and routes it to a signal conditioning path unit that is adapted to alter the electrical characteristics of the input signal to produce a first modified input signal. The second switch is configured to receive the first modified input signal at an input port and route the first modified signal to an output port according to a switch control instruction. The amplifier is configured to receive the first modified input signal from the output port of the second switch and to adjust a voltage level of the first modified input signal to produce a second modified input signal. The ADC receives the second modified input signal and provides the processor with a corresponding numerical value based on the second modified input signal. The processor receives the corresponding numerical value and ascertains a message of a communications protocol associated with the received interface signals.

In another embodiment of the disclosure, a method is provided for processing a plurality of input signals received at a DREI of a first communications protocol comprising the steps of receiving the input signals having a first voltage at a first switch and routing the input signal to a signal conditioning path unit that modifies the plurality of input signals to a plurality of corresponding second voltages. The input signals with corresponding second voltages are then routed at a second switch from an input port to an output port and providing the plurality of input signals to an amplifier. The amplifier is configured to adjust the second voltage to a plurality of corresponding third voltages and provide the plurality of input signals having the third voltages to an analog-to-digital converter ("ADC"). The ADC in turn provides a plurality of numerical values based on the third voltage to a processor. The processor is configured to ascertain a message based on a communications protocol, wherein the processor executes instructions for ascertaining the message based on the communications protocol.

In yet another embodiment of the disclosure, an avionics data processing system is provided that comprises one or more dynamically reconfigurable electrical interface ("DREI") devices and wherein each DREI comprises a memory storing a plurality of instruction sets, wherein each instruction set is associated with one of a plurality of communications protocols. A processor is configured to select one of the plurality of instruction sets, and generate a numerical value based on generating an output signal of the DREI device. The numerical value is then provided to a digital to analog converter ("DAC") configured to receive the numerical value and generate a first intermediate output signal having a first voltage. The first intermediate output signal is then provided to an amplifier configured to receive the first intermediate output signal and generate a second intermediate output signal having a second voltage. A first switch is configured to receive the second intermediate output signal and provide the second intermediate output signal at an output port of the first switch. A signal conditioning path unit is configured to receive the second intermediate output signal and provide it to a second switch, which routes the second intermediate output signal to an output port to generate the output signal.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 4A-4C illustrate other embodiments of a dynamically reconfigurable electrical interface involving a single processor and multiple communication interfaces according to the embodiments disclosed herein.

DETAILED DESCRIPTION

Figure 1:
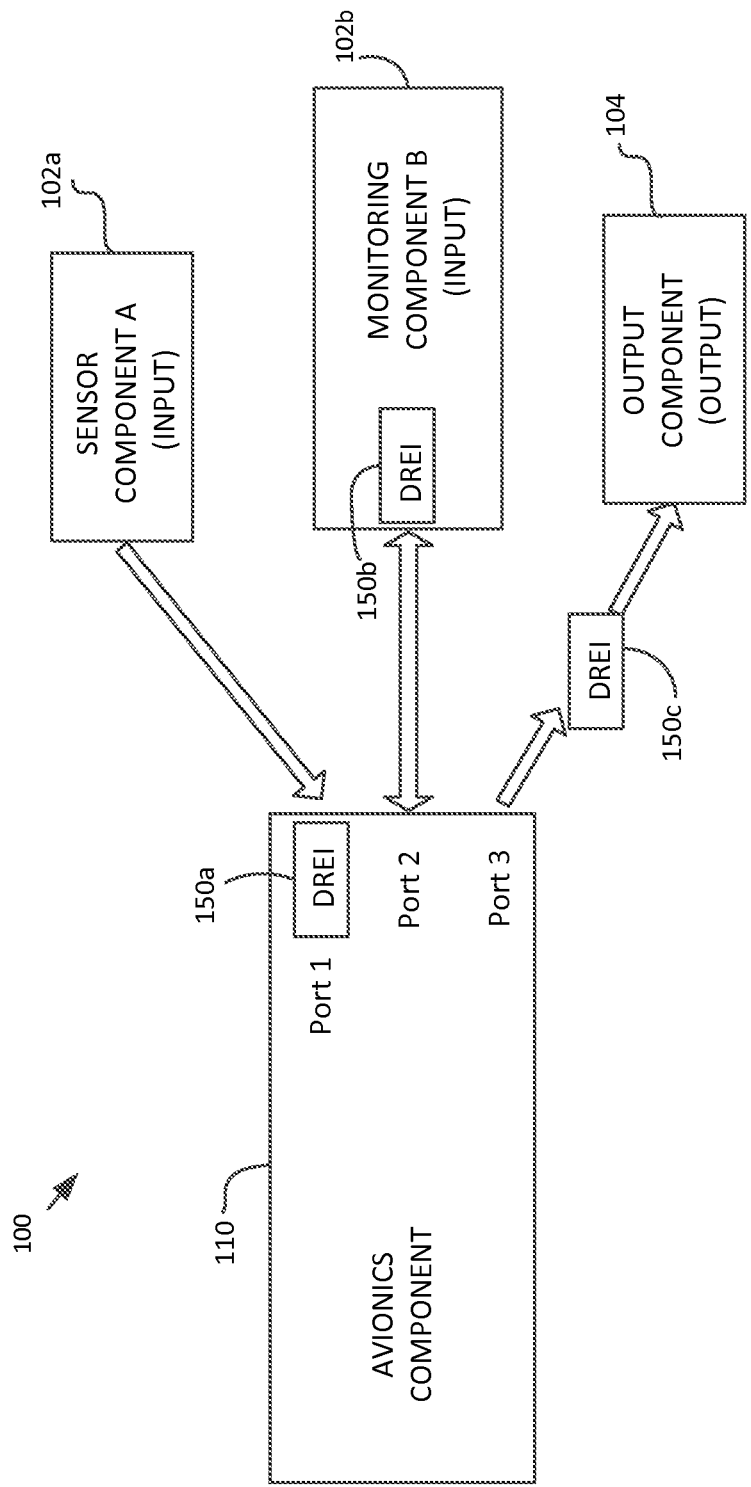
FIG. 1 illustrates one embodiment of an environment utilizing a plurality of input and output components interfacing with an avionics component using a plurality of dynamically reconfigurable electrical interface devices.

The following detailed description is directed to systems and methods for a flexible dynamically reconfigurable electrical interface ("DREI"). Although various embodiments are described in the context of electronic systems ("avionics") involving an aircraft, it should be recognized that the application of the disclosure is not limited to avionics systems, nor limited to the disclosed communication systems. In the following detailed description, references are made to the accompanying drawings by way of illustration and various embodiments of the disclosure. In the drawings, like numerals represent like elements.

Aircraft incorporate various on-board data handling systems, including but not limited to: flight management computers, communication systems, inertial reference systems, air data computers, radar altimeters, radios, and GPS systems. Other systems may be incorporated which require communication of information between components. For example passenger aircraft are often provided with in-flight entertainment systems that provide in-flight video, audio, and in-flight Internet access, which require components interfacing for video, audio, and data transfer. While all these components may not be necessary or present for the flight management of the airplane, they illustrate examples of components using different electrical interfaces.

All these systems typically involve components that communicate with other components of other systems using communication protocols. These communication protocols define various aspects necessary for the components to connect and communicate information. These aspects include definition of physical plugs, pin designations, voltage definitions, information encoding definitions, message definitions, procedures for exchanging data, and procedures for distinguishing from control and data signals. Various industry defined standards have been developed, some which are targeted for avionics, and others which were developed for other applications, but which have been adapted for avionics. Existing avionics standards include the ARINC-429 standard and the MIL-STD-1553B standard which is typically associated with military platforms. Other standards that originated outside of aviation may be used in commercial aircraft subsystems, and include data transfer protocols such as EIA-232, EIA-422, USB, etc.

Each of these electrical interfaces has different characteristics. For example, the ARINC-429 standard uses a shielded 78Ω twisted pair cable. This is compatible with the MIL-STD-1553B standard which specifies a 70-85Ω cable, but the opposite is not true (e.g., MIL-STD-1553B is not limited to a 78Ω cable). Further, the ARINC-429 standard defines a 10 volt peak differential voltage; whereas MIL-STD-1553B defines an 18-27 volt peak-to-peak output voltage. Similarly, the EIA-232 standard defines a +/−15 volt receiving input range, but the EIA-422 standard defines only a +/−10 volt receiving input range. These examples illustrate only a couple of the incompatibilities of the various electrical interfaces.

These different interfaces can be accommodated using different interface-specific circuits (e.g., circuits which implement a particular electrical interface), but doing so limits the component to that specific interface. Obviously, incorporating hardware-specific chips requires the supporting component to be designed for that particular interface-specific circuit. While other interface-specific circuits could be added for future flexibility, doing so when they are not needed unnecessarily increases the cost of the component.

Using interface-specific circuits not only requires designing each component for using a particular chip, but then each component requires testing, debugging, and training maintenance personnel for repair, stocking repair components as necessary, etc. These costs could be minimized by developing a dynamically reconfigurable electrical interface that could be readily adapted for these different communication interfaces.

In one embodiment of the disclosure, shown in FIG. 1, the system 100 may comprise an avionics component 110 having various ports or interfaces 150 in communication with various input or output ("I/O") devices or other components 102. Although these are shown as distinct physical ports, these could be viewed as logical ports, where information to the various components 102a, 102b, 104 is multiplexed over a single physical communications facility. These I/O devices may comprise in one embodiment, for illustrations purposes, a sensor component 102a, a monitoring component 102b, and output component 104. The function and purpose of these components can vary and are not limited to the embodiments described herein. These components 102a, 102b, and 104 could be input, output, or a combination thereof as appropriate. Further, these I/O components, as well as the avionics component, can comprise various hardware/software configurations, using single or multiple microprocessors, parallel processors, or other programmable logic circuitry.

The embodiment of FIG. 1 illustrates the avionics component 110 comprising three ports that are in communication with the three separate components, 102a, 102b, and 104 that use different electrical interfaces. Rather than using separate, interface-specific chips to realize each electrical interface (which could require three interface-specific integrated circuits), one embodiment of the present disclosure allows a single, dynamically reconfigurable component to be replicated and associated with each port for interfacing with each of the distinct electrical interfaces. This embodiment illustrates three different approaches for applying the principles of the present disclosure, and illustrates how a single generic DREI can be used to implement a variety of electrical interfaces. Use of a common DREI that can be adapted for a variety of communication interfaces facilitates the design, manufacturing, testing, and repair of the components in FIG. 1, and can reduce overall costs associated with manufacturing and maintaining complex systems, such as those used in aircraft.

FIG. 1 also shows the avionics component 110 incorporating a DREI within its physical assembly. This allows the desired communications interface and protocol to appear as part of the component 110 to the sensor component 102a. In this embodiment, the communication is unidirectional, but could be bi-directional. Thus, any sensor component 102a compatible with the desired communications interface can readily plug into, and communicate with, the avionics component 110. Since the avionics component 110 may incorporate other types of interfaces, adopting the principles of the present disclosure allows the subsystem to readily adapt to communicate with a variety of devices.

As shown in FIG. 1, the DREI 150b can be incorporated into a monitoring component 102b itself. This embodiment illustrates a monitoring component 102b which could provide data to the avionics component upon request. Hence, the communication is bidirectional and shown with a bidirectional arrow. However, it could just as easily be similar in function to the sensor component 102a, or the output component 104. In this manner, the monitoring component 102b may be "converted" to use a communications protocol recognized by the component 110 and which is otherwise not native to the component 102b.

Still another embodiment involves using a separate standalone DREI 150c that is distinct from the avionics component 110 and the output component 104. In this embodiment, the DREI allows otherwise incompatible components to communicate with each other via the intermediate DREI 150c. The DREI in this embodiment may incorporate further functionality in the DREI so as to communicate with the avionic system 110. Further, in any of these configurations, multiple DREIs could be incorporated allowing multiple distinct physical or logical interfaces to be provided.

The embodiment shown in FIG. 1 illustrates three applications of a DREI in different configurations. In other embodiments, only a single DREI may be incorporated, or some other combination that is not shown in FIG. 1. Further, a plurality of DREIs could be incorporated into any of the above configurations. Further, the DREI may be involved in converting data from one protocol to another. Thus, the DREI may incorporate well-known data communication protocols, such as but not limited to, a microcomputer bus (e.g., peripheral component interconnect "PCI" bus). For example, the DREI 150a could be implemented as a board which is inserted into a computer, and communicates over an internal computer bus.

The principles herein can be adapted for a variety of purposes, and are not limited to avionics, but can be applied to various other communication applications, which can be incorporated into different components. This can include other systems that typically include a number of interfaces on automobiles, ships, trains, military conveyance vehicles, consumer electronic devices, appliances, building control systems, power control systems, etc.

Figure 2:
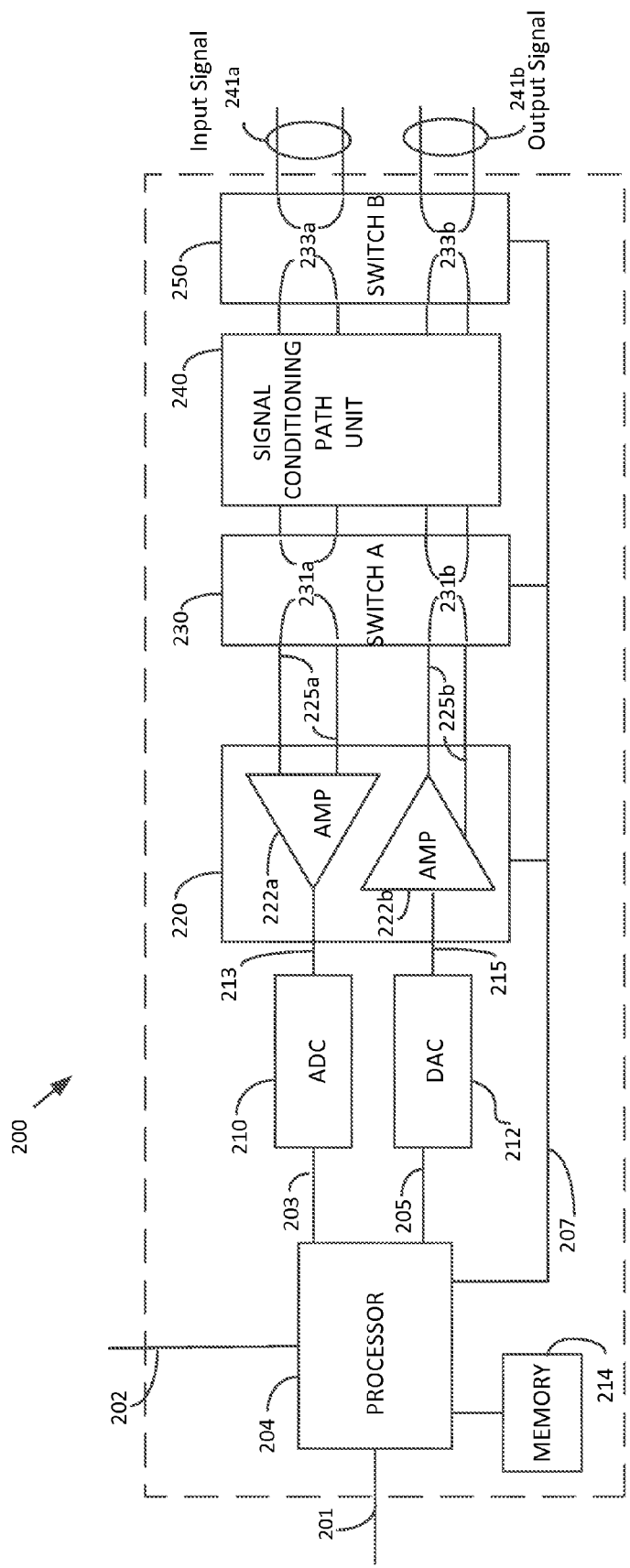
FIG. 2 illustrates one embodiment of dynamically reconfigurable electrical interface.

FIG. 2 illustrates one embodiment of the DREI 200. This embodiment illustrates a bi-directional communication arrangement, where the DREI receives incoming information, and transmits outgoing information. Typically, the information provided to/from the DREI is in digital form, and for illustration purposes, the term "messages" can be used to describe control information defined in the applicable interface, which can be used to convey commands or data. One skilled in the art can adapt the principles of the present disclosure to apply to receiving and generating analog signals as well as digital messages.

The DREI 200 receives input signals 241a associated with a specific communications protocol and is able, in one embodiment, to process the same and communicate corresponding or responsive signals over a common bi-directional I/O system interface 201. Similarly, the DREI 200 is able to receive information on the common I/O system interface 201, and generate interface specific communications output signals 241b. In other embodiments, the DREI is able to act on the received signals, or generate output signals on its own accord. This same DREI 200 can be reprogrammed or reconfigured for various types of specific communication protocols used on inputs/output 241 as needed. The input signals 241a, 241b can be differential signaling, or in other embodiments, can be single-ended signaling. Further, a plurality of different input signals can be received.

Assume for purposes of illustration that input signals 241a comprise a transmission of a particular communications protocol that is received by DREI 200. These signals can be conveyed on a two-wire interface, which are received at an input port of switch 250. The switch 250 may route the incoming signals over ports 233a to a signaling path conditioning component 240, or the switch 250 can bypass the signal conditioning path unit 240 and route the input signals directly to switch 230. The signal conditioning path unit 240 may adapt, modify, or otherwise adjust the signals in a first level of processing so that the input signals have characteristics that are compatible with the subsequent processing components (e.g., switch 230 or amplifier 222) so as to comply with a particular standard. For example, MIL-STD-1553B indicates that incoming signals should be routed to isolation transformers, whereas other standards do not specific this. Thus, switch 250 may be used to route the incoming signal 241a to the proper signal conditioning path unit 240. In another embodiment, the input signals 241a could be received as optically based signals, whereas the DREI 200 is electrically based. In this case, the signal conditioning path unit could comprise an optical-to-electrical conversion circuitry. Still, in other embodiments, step-down transformers can be used to condition the signals to modify the input signal. Other components in the signal conditioning path may limit, protect, modify, or protect against dangerous voltage levels occurring at the inputs 241a or alter the current or impedance characteristics.

Once the signals are modified by the signal conditioning path units 240, they are received by ports 231a on a second switch. Switch 230 serves to route the differential signals 225a, 225b to the respective proper amplifier 222a or 222b. In other embodiments, the switch 230 may not be present, but incorporating this functionality allows additional flexibility as will be seen. The switch 230 allows the input or output lines to be dynamically reconfigured and a processor 204 controls the switch 230 (as well as switch 250) using a switch control signal or switch control instructions sent to the switch 230 via control lines 207. For example, if the DREI 200 were to handle two separate inputs 241a, the switch 230 and switch 250 can assist in accommodating this capability and route the corresponding input signals to two signal conditioning path units. In another embodiment, if the input signals were received on lines 241b instead of 241a, the processor 204 could instruct the switch accordingly via control line 207 to accept inputs on 241b. The switch is controlled in this embodiment by processor 204 generating a switch control signal, but the switch can be controlled by external inputs in other embodiments. For example, control input 202 to the processor 204 could be extended to control the switch 230 and/or 250 directly.

The resulting conditioned or modified input signals are provided as an input signal to the signal level adjusting unit 220, which comprises in one embodiment operational amplifiers 222a, 222b. In this embodiment, operation amplifier 222a receives the signal input and generates a further modified signal which is a voltage adjusted signal on output line 213. The appropriate adjustment level can be controlled by the processor 204 via an amplifier control signal on control lines 207. In this embodiment, the control line 207 multiplexes various control to the signal adjusting unit 220 and the switches 230, 250, but separate control lines could be employed as well. The amplifier 222a further modifies the signals and ensures that the signal levels provided by the amplifier at output 213 are normalized to the expected levels. In this manner, any input signal 241a, whether it is in an optical, wireless, or electrical form is converted to a signal-level electrical signal with an appropriate level that can be read by the analog-to-digital converter ("ADC") 210. In one embodiment, the input signal levels to the ADC 210 are typically no greater than the maximum input level that can be processed by the ADC in order to provide an accurate value. Otherwise, levels that exceed the input of the ADC will be mapped to a single numerical value. This may be acceptable in some embodiments.

The output 213 of the amplifier is received by the ADC 210. The ADC 210 receives an analog signal and converts it to a digital value. The ADC 210 converts the voltage signal to a numerical value that is communicated over lines 203 to a processor 204. The ADC 210 should be capable of digitizing input sufficiently fast enough so that changing incoming information conveyed for the processor 204 is not lost. This speed is dependent on the nature of the output 213.

The processor 204 then applies the appropriate communication processing rules to determine the appropriate syntax, semantics, and procedures to ascertain the messages being transmitted over interface 241a. Specifically, the processor 204 can store one or more communication library routines for ascertaining the corresponding signal levels, timing, and encoding schemes used, so that the processor 204 can ascertain what message was sent to the DREI at the input signal 241a, and what protocol procedures are to be applied for interpreting the input signal 241a on the numerical values received at the processor 204. In certain embodiments, the processor can automatically configure itself based on detecting incoming signals and compare their characteristics against a known characteristics table to determine the interface. The processor can report the interface to another processing entity, or select the appropriate communication library routine to use.

The processor 204 may convert this information over a common I/O interface 201 which can be formatted to another standard (e.g., a PCI bus). Interface 201 may be the backplane or data bus of a known computing architecture, such as, but not limited to, Virtual Memory Extension ("VME"), Micro Channel Architecture ("MCA"), or Peripheral Component Interconnect ("PCI"). Or, the processor 204 may incorporate other application level control logic to handle the received message (e.g., the processor may act on the received information). In this case, there may not be any need for the processor 204 to relay the information to another entity.

For purposes of illustration, it is assumed that some other component, such as the avionics controller 110 responds over the interface 201 to the processor 204. The processor 204 may utilize stored program information in memory 214 to determine the application specific information to be sent. The memory can be of various forms well known in the art, and can be integrated into the same integrated circuit as the processor, or stored in a separate circuit. The memory can be various forms of volatile or non-volatile memory.

If the incoming message on interface 241a is a request for a certain type of data, for example, this request can be routed by the processor via interface 201 to another component in the avionics controller 110. This component will respond to the processor 204 over the interface 201 with the requested data. Depending on the particular interface 241a, the response may be sent by the processor 204 in a particular manner over output 241b. The processor 204 determines the appropriate message, encoding, timing, etc. to be used based on the library of instructions for each electrical interface. It is possible in some embodiments that input signal on interface 241a is a different electrical interface than the output interface 241b.

Attention is now turned to how the processor 204 would generate a response (or output signal) on lines 241b. The processor 204 generates the appropriate numerical values over lines 205 to the digital-to-analog converter ("DAC" 212) which generates a discrete voltage level signal in response. This value will be the appropriate value for representing the appropriate signal after processing by the subsequent units. For example, if the processor is to send a digital bit stream of "101" which has certain duration, voltage, and timing, the processor will generate the appropriate values and present them to DAC 212. The DAC in turn converts the digital value to a signal with the appropriate analog voltage level (more specifically, to one of various discrete voltage levels which approximates an analog voltage wave).

In turn, the amplifier 222b generates the appropriate voltage signals 225b, which the switch 230 connects via ports 231b to the signal conditioning path unit 240. The amplifier 222b again is controlled by the processor via an amplifier control signal 207 such that the output level is appropriate for the communications interface 241b. For example, if a logical "1" is represented by a 15V signal for a certain time period, the amplifier 222b is configured to amplify the input signal to the 15V signal. The processor 204 controls the duration by providing the appropriate output signal to the DAC 212 for the corresponding duration.

The output of the DAC is provided to the switch 230 to the signal conditioning path unit 240, if necessary. The signal conditioning path unit incorporates the appropriate components for generating the appropriate types of signals at the required level. For example, if the output signal is optical in nature, the signal conditioning path units may have electro-optical converters. Other signaling path condition components can ensure the appropriate impedance, current, voltage, etc. is present on the output. In this manner, the processor can generate a variety of signal levels that are defined to convey a particular message in a particular communications protocol over interface 241b.

In certain embodiments, signal conditioning may not be required. In this case, the output of switch 230 on port 231b can bypass the signal conditioning path unit 240 if no signal conditioning path unit is required. Thus, the output could be routed directly to switch 250. Alternately, a "null" signal conditioning path function can be defined as being performed by the signal conditioning path unit, effectively accomplishing the same result. If the signal conditioning path unit 240 is not bypassed, then the output is provided via port 231a of switch 230 to the signal conditioning path unit 240. The signal conditioning path unit's 240 output can be provided to switch 250 on ports 233a, which provides the output signal 241b.

The processor 204 can be a general purpose microprocessor, a special purpose programmed microprocessor, an application specific integrated circuit, or other types of system-on-chip ("SOC") processors. Other types of processors are possible as well. In other embodiments, the ADC(s) and DAC(s) can be integrated with the processor and can be implemented using a digital signal processor or other special purpose device. As noted previously, the memory for storing the rules for processing and generating input/output signals can be stored in memory 214 that is integrated with, or external to, the processor 204.

In other embodiments the processor can be a field programmable gate array, which may also have integrated ADCs and DACs. In addition, in various embodiments, the amplifiers 220 and/or switches 230, 250 can be integrated with the above components. Those skilled in the art will recognize that other implementations are possible.

Figure 3A:
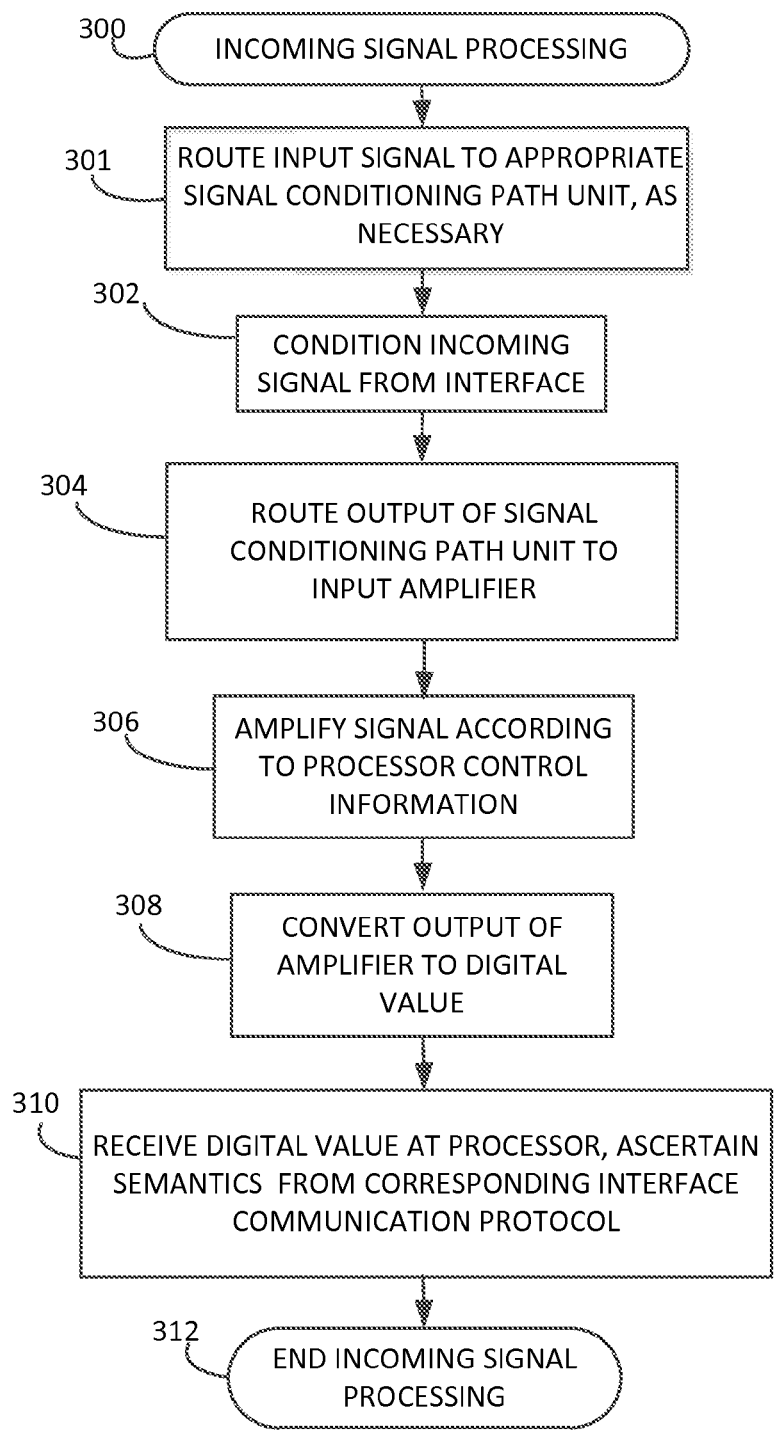
FIGS. 3A and 3B respectively illustrate one embodiment of a method for processing an input signal in a dynamically reconfigurable electrical interface and an output signal in a dynamically reconfigurable electrical interface.

To summarize, the operations performed by the device 200 for processing a received input signal on interface 241a are shown in the overview 300 of FIG. 3A. It should be appreciated that more or fewer operations may be performed than shown in the FIG. 3A and described herein. Moreover, these operations may also be performed in a different order than those described herein. In step 302 the input signal received on interface 241a is routed in step 301 by switch 250 for conditioning to ensure that the electrical aspects are compatible with the upstream processing components in the device 200. In some other embodiments, the routing of the signal may bypass the signaling conditioning unit. The conditioning performed in step 302 may include converting the type of signal or electrical characteristics, such as voltage, current, and impedance. In step 304, the resulting conditioned signal is then provided to another switching element that routes the output to the appropriate amplifier. In step 306 the selected amplifier receives the signal and may amplify the signal to the appropriate signal level, which is still analog in nature, so that it can be processed by the ADC. In step 308, the ADC converts the analog signal to a signal having a digital value (e.g. having one of plurality of discrete values), which in step 310 is processed by the processor to ascertain what information was received. In particular, this processing may involve retrieving information as to the syntax, semantics, and procedures in order to ascertain what messages are being conveyed. At this point the processor has successfully received the input signal, and can recognize the information being conveyed by the corresponding communications protocol.

The processor's processing of the numerical value presented to the DREI on input port 241a depends on the particular communications interface involved. The processor will typically compare the value (which is indicative of a signal level), applicable encoding scheme, timing information, and other aspects to ascertain whether a logical "0" or "1" was sent. As additional bits are ascertained, the processor will apply further rules defining the particular framing structure used for conveying a message in that protocol, and can determine the contents of the message within the framing structure. Those skilled in the art will recognize that each communications protocol will involve separate and distinct processing by the processor in order to recognize the conveyed syntax and the semantics and can end processing as shown in step 312.

Figure 3B:
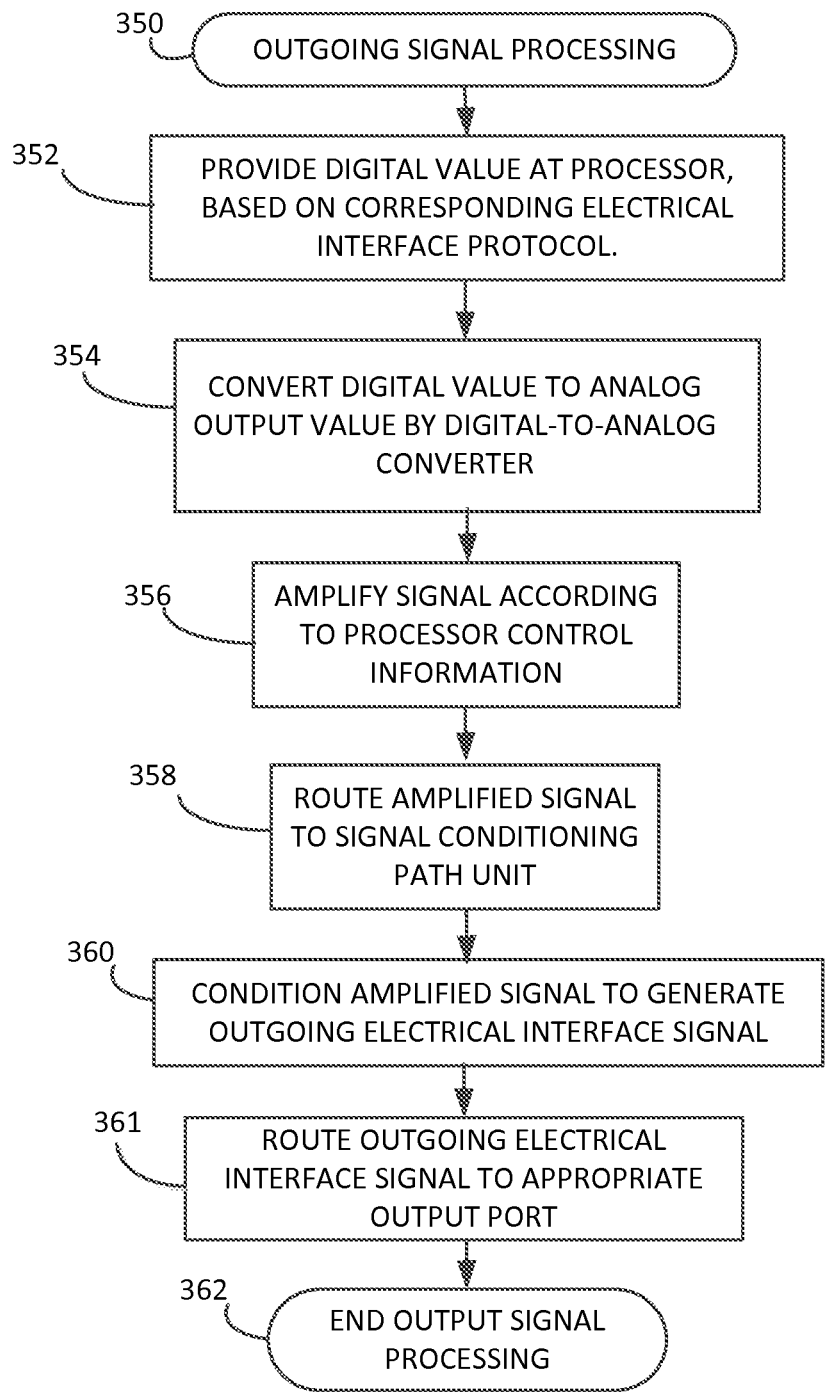

The operations performed by device 200 for processing an output signal on interface 241b are shown in the overview 350 of FIG. 3B. It should be appreciated that more or fewer operations may be performed in the process of FIG. 3B as compared to the operations shown in FIG. 3A and described herein. In step 352 the processor provides a numerical digital value that determines the corresponding output signal on interface 241b for the respective electrical interface. The numerical value is provided in step 354 to a DAC that converts the numerical value to an analog output. In step 356 the analog output is provided to an amplifier, which amplifies the signal based on control information provided by the processor. In step 358, the amplified signal is provided to a switch which routes the amplified signal to the conditioning equipment. In step 360, the conditioning equipment conditions the signal as appropriate, and provides the output signal at its output interface. In step 361, another switch receives the output signal and routes it to the appropriate output port. At this point, the processor has successfully generated an output signal based on the electrical interface specifications for the corresponding communications protocol.

The configuration illustrated in FIG. 2 is one embodiment capable of processing a single input communications interface 241, comprising both an input 241a and output 241b capability. Other embodiments may employ only an input or an output.

Figure 4A:
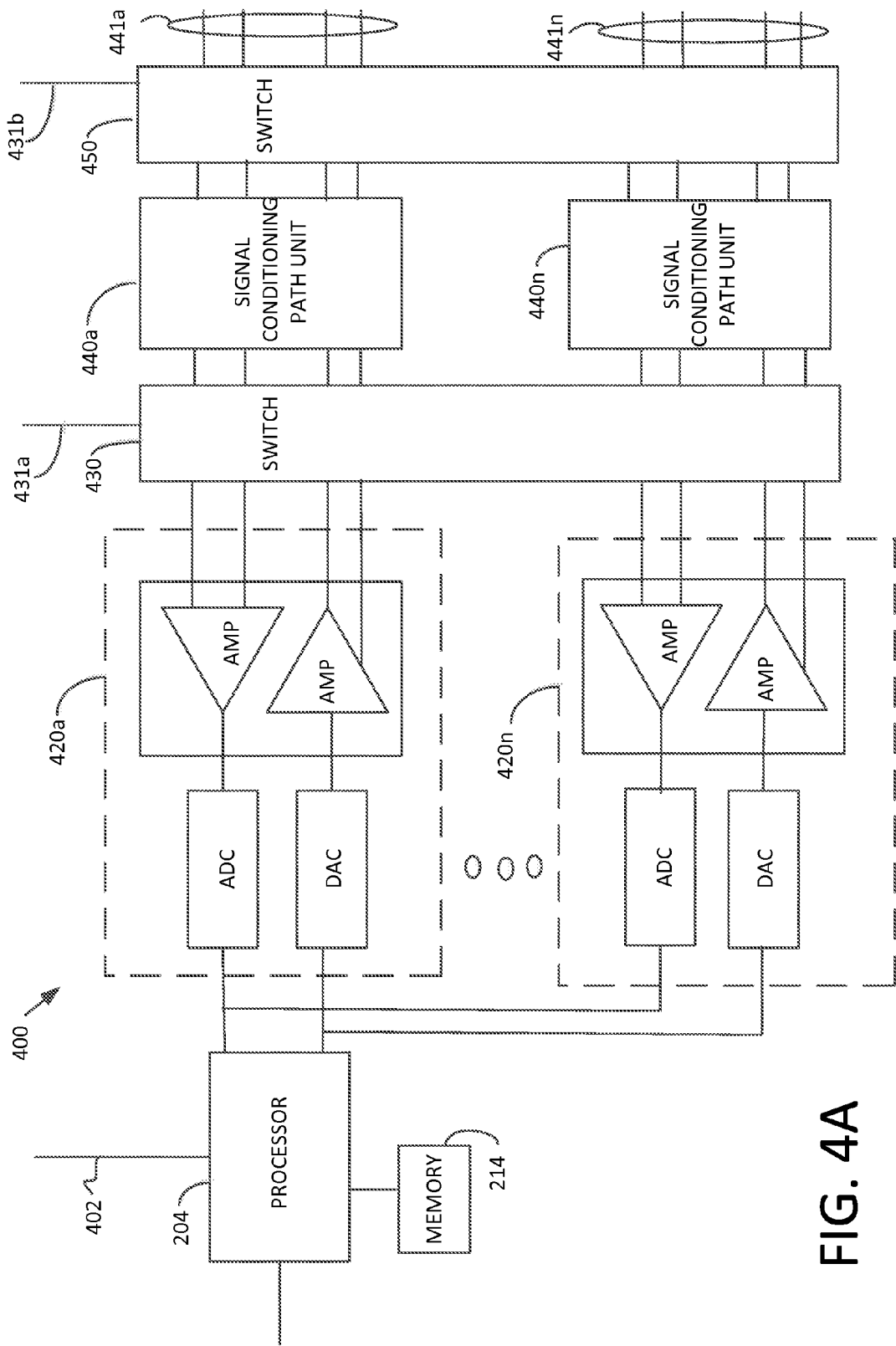

In many embodiments, a plurality of communication interfaces exist, with each interface including an input and output. It may be desirable to communicate with a variety of distinct communications devices on various interfaces using a plurality of communication protocols on the interface 241, either simultaneously, or at different times. One such architecture 400 is shown in FIG. 4A. This embodiment illustrates further advantages and flexibility.

In this embodiment, a processor 204 stores in memory 214, or is able to otherwise access, instructions for processing two or more communication protocols, which may be distinct. In this embodiment, the switch 450, signal conditioning path unit 440a, switch 430, amplifier and ADC/DAC assembly 420a communicates with the processor 204 as described in conjunction with FIG. 2. However, the ADC/DAC and amplifiers components 420a are replicated n times, as shown by assembly 420n. Each assembly 420 is connected to the switch 430 and can be connected to a particular signal conditioning path unit 440n (or bypassed) and then connected to an interface 441a-441n. Thus, interface 441a can be, for example, one interface type, and interface 441n can be another interface type. This allows the processor to service two or more different type of interfaces, either simultaneously, or on a time multiplexed basis. The ability to handle different signal conditioning path requirements for each interface is also a benefit of the architecture shown in FIG. 4A.

Furthermore, it is possible to configure processor 204 via instructions on interface 402 as to which communications protocol is to be used for interface 441a and 441n. The processor can then apply the appropriate instruction set for processing input/output according to the appropriate protocol. Thus, the processor can be programmed dynamically to handle different communications protocols for interface 441a and 441n. In another embodiment, the set of instructions for handling a particular communications protocol can be downloaded to the processor 204 as required. Thus, a newly developed protocol with different signaling requirements could be accommodated by the system 400 by downloading the appropriate protocol processing instructions to the processor.

Based on which interface 441a-441n is to be associated with which protocol, the switch 430 and switch 450 can be instructed via control line 431a and 431b respectively to route the signal to the appropriate amplifier/ADC/DAC assembly 420 and signal conditioning path unit 440. Thus, a system can be easily reconfigured to handle input (or output) on either of the given interface lines 441a, 441b.

Figure 4B:
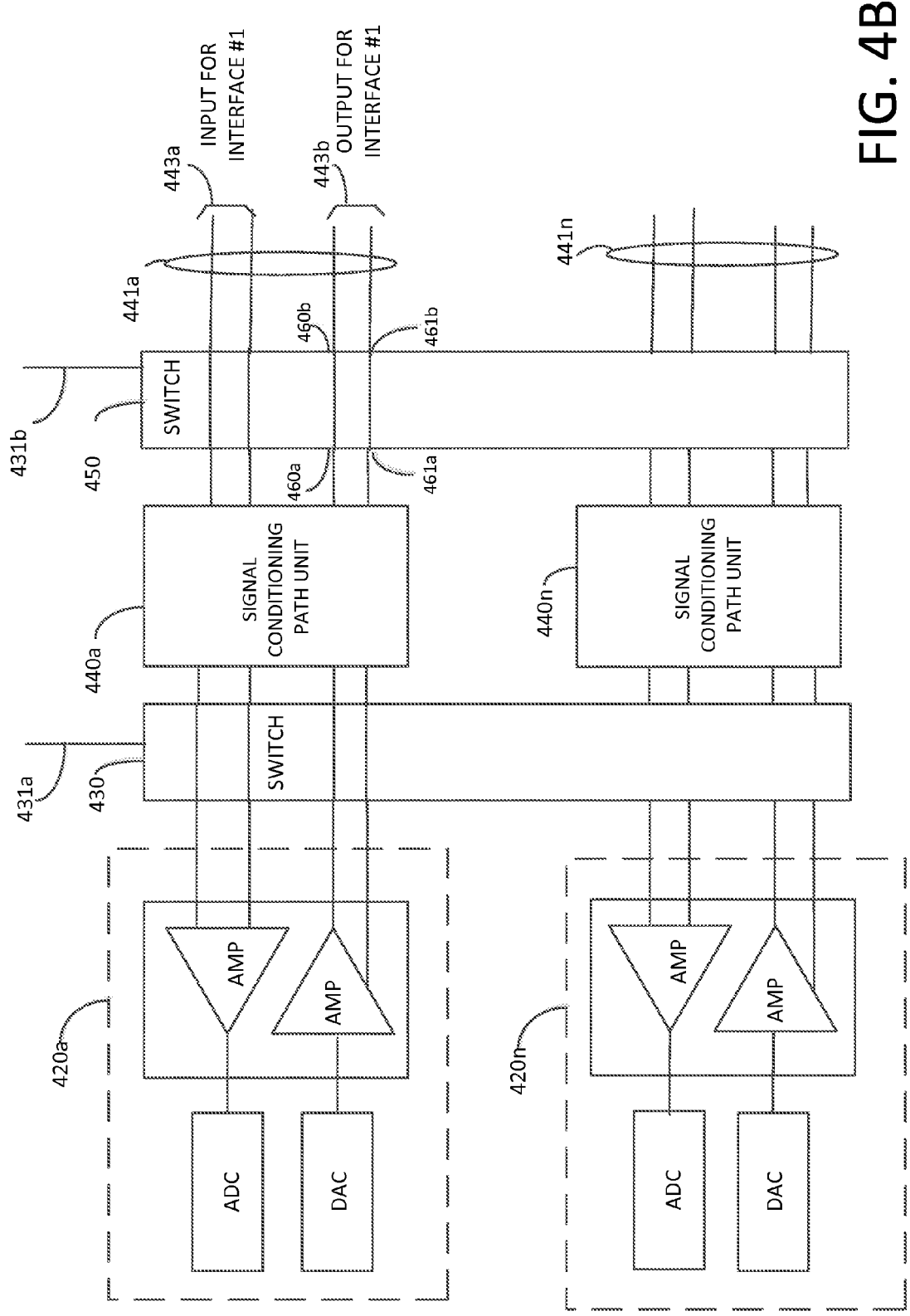

FIG. 4B shows a portion of the architecture of FIG. 4A and further illustrates one arrangement for connecting the connecting contacts of switch 430 and 450. In this embodiment, the switches can be analogized in functionality to a relay switch, which either connect to close a circuit, or disconnect to open a circuit. In FIG. 4B, interface 441a comprises signals 443a for the input, and signals 443b for the output. When directed, switch 450 connects the leads 460a, 461b to the lead 460b, 461b. In this manner, the output is provided for the output interface 443b.

However, in other embodiments, the switches may be an electronic matrix type switching element able to connect any port to any port. This embodiment is illustrated in FIG. 4C. In FIG. 4C, the interface 441a again comprises a set of input and output, but the inputs 443 and the outputs 447 are not necessarily arranged as shown in FIG. 4B. In this embodiment, a set of inputs and outputs could be defined as an interface. In this case, the switch 450 is able to route signals between port 465b to port 460a, and port 466b to port 461a. This type of arrangement can be used, for example, when a plurality of inputs and outputs for a plurality of interfaces are multiplexed onto a single optical fiber. Further, this type of arrangement can provide N+1 redundancy for accommodating a failed signal conditioning path unit. For example, if signal conditioning path unit 440a fails, then switch 430 and 450 could be instructed instead to use another signal conditioning path unit (e.g., 440n).

Figure 5:
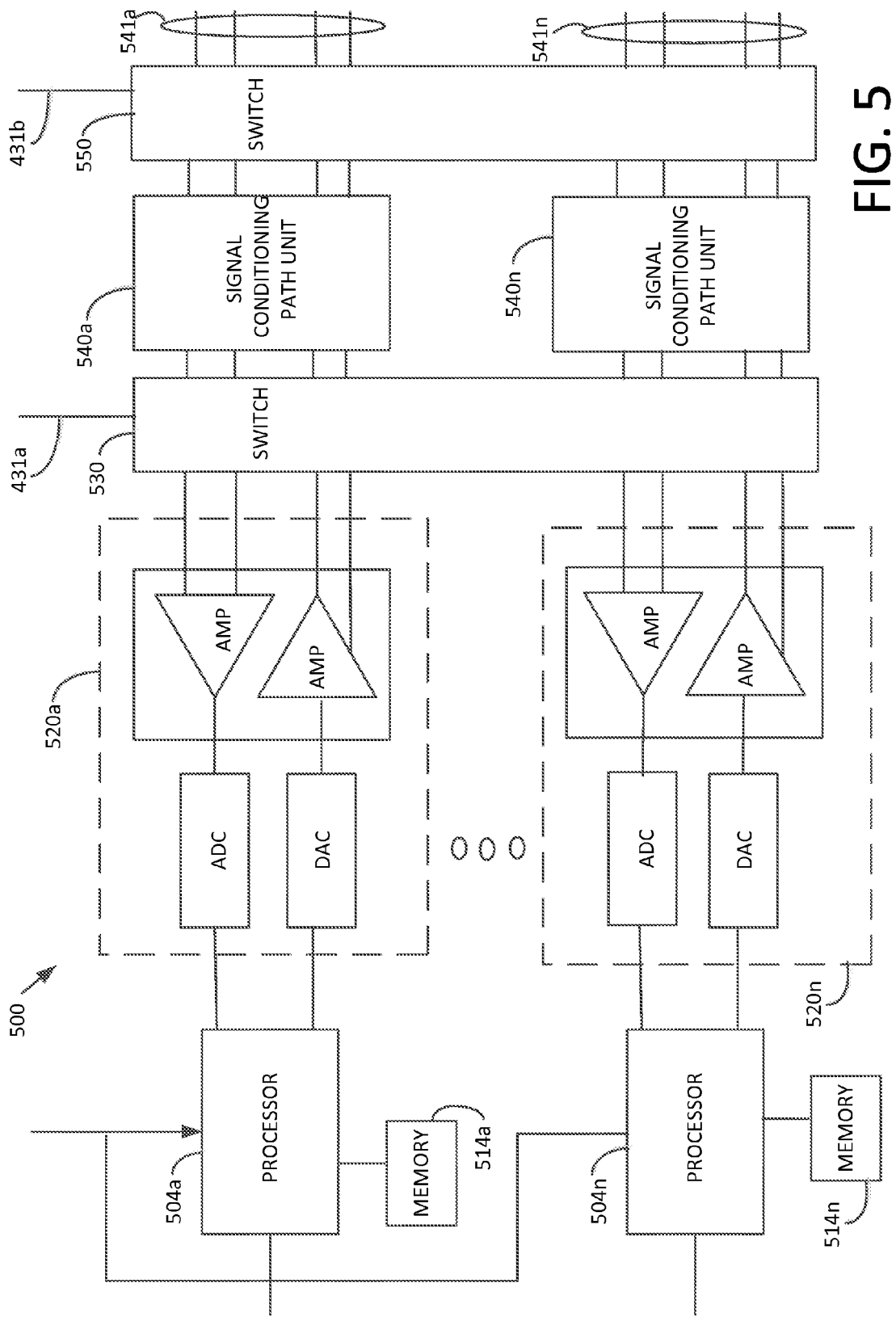
FIG. 5 illustrates another embodiment of a dynamically reconfigurable electrical interface involving multiple processors and multiple communication interfaces.

Another embodiment 500 is illustrated in FIG. 5. In this embodiment, the processor 504 is replicated (504a-504n). In this embodiment, each processor 504 is shown connected to a respective memory 514, but in other embodiments, all the processors could access a common memory. Further, each processor 504a-504n is associated, in turn, with an ADC/DAC/Amplifier assembly 520a-520n and interconnected with a common switch 530. The switch in turn, is connected to n number of signal conditional path units 540a-540n as appropriate. The outputs of the signal conditioning path unit are provided to another switch 550, which then presents the signal on the interfaces 541a-541n as appropriate. In this embodiment, each processor 504 is configured to handle a specific interface 541. With this architecture, a unit with n processors and n interfaces could be configured to handle n different communication protocols.

It is evident from the above Figures that a single dynamically reconfigurable interface structure (e.g., system 200, 400 or 500) can be readily adapted to handle one or more communication interfaces. A single interface structure could have instructions loaded into storage that are used by a processor for handling a particular communication interface ("Protocol A"). In this manner, such an interface structure could easily be reconfigured to adapt to another communication interface ("Protocol B"). This could be accomplished by using the same interface structure 200, but reconfiguring the DREI instead with instructions for a different communication interface (Protocol B). In this manner, a single interface structure board could be stocked in a parts depot and configured to replace a variety of units, thus eliminating a need to stock a component for every possible interface type.

It is also evident that a DREI could be loaded with instructions to handle a variety of communication interfaces after it was installed (as opposed to being loaded with the appropriate instructions before installation). Upon replacing such a module with a DREI capable unit, other (external) components could configure the processor to select and use a given communication interface. In this manner, an easily reconfigurable replacement module could be defined.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A dynamically reconfigurable electrical interface ("DREI") for processing received interface signals comprising:
   a first switch configured to receive an input signal received at the DREI and route the input signal;
   a signal conditioning path unit receiving the input signal and adapted to alter electrical characteristics of the input signal, the signal conditioning path unit producing a first modified input signal based on the input signal;
   a second switch configured to receive the first modified input signal at an input port, the second switch configured to route the first modified signal at the input port to an output port based on a switch control instruction;
   an amplifier configured to receive the first modified input signal from the output port, the amplifier configured to adjust a voltage level of the first modified input signal to produce a second modified input signal;
   an analog to digital converter ("ADC") configured to receive the second modified input signal, the ADC providing a first numerical value based on the second modified input signal;
   a processor configured to receive the first numerical value, wherein the processor unit is configured to ascertain a message of a communications protocol associated with the received interface signals;
   a digital-to-analog converter ("DAC") configured to receive a second numerical value from the processor and generate an output voltage level; and
   a second amplifier configured to receive the output voltage level and generate in response an amplified output voltage level,
   wherein the second switch is configured to receive the amplified output voltage level at another input port and provide the amplified output voltage at another output port,
   wherein the signal conditioning path unit is adapted to provide a corresponding output signal to the first switch, and
   wherein the first switch provides the output signal at an output interface.

2. The electrical interface of claim 1 further comprising:
   a memory storing a set of instructions associated with the communications protocol used by the processor for ascertaining the message of the communications protocol.

3. The electrical interface of claim 1 wherein the processor is configured to provide an amplifier control signal to the amplifier to adjust the voltage level for producing the second modified input signal.

4. The electrical interface of claim 3 wherein the amplifier adjusts the voltage level to produce the second modified input signal so that the ADC can produce a distinct corresponding numerical value.

5. The electrical interface of claim 1 wherein the processor is configured by a set of instructions associated with the communications protocol to control the first switch to route the input signal to the signal conditioning path unit.

6. The electrical interface of claim 5 further comprising:
   a plurality of amplifiers; and
   a plurality of ADCs, wherein each amplifier is connected to a respective ADC, and each respective ADC is configured to provide a respective corresponding numerical value to the processor.

7. The electrical interface of claim 6 wherein the processor is configured to control each one of the plurality of amplifiers.

8. A method for processing a plurality of input signals comprising:
   receiving the plurality of input signals having a first voltage at a first switch;
   routing the plurality of input signals at the first switch;
   receiving the plurality of input signals at a signal conditioning path unit that modifies the plurality of input signals to a plurality of corresponding second voltages;

routing the plurality of input signals having the plurality of corresponding second voltages at a second switch from an input port to an output port;

providing the plurality of input signals with the plurality of second voltages to an amplifier, the amplifier configured to adjust the plurality of second voltages to a plurality of corresponding third voltages;

providing the plurality of input signals having the third voltages to an analog-to-digital converter ("ADC"), the ADC providing a plurality of first numerical values based on the third voltage;

receiving the plurality of first numerical values at a processor, the processor configured to ascertain a message based on a communications protocol, wherein the processor executes instructions for ascertaining the message based on the communications protocol;

generating a second numerical value by the processor, the second numerical value associated with an output signal associate with the communications protocol;

receiving the second numerical value by a digital-to-analog converter ("DAC"), the DAC providing an output voltage in response;

receiving the output voltage at a second amplifier from the DAC, the second amplifier providing a second output voltage;

receiving the second output voltage at the second switch, the second switch providing the second output voltage to the signal conditioning path unit;

providing an output signal from the signal conditioning path unit to the first switch; and providing the output signal from the first switch.

9. The method of claim 8 wherein the processor is configured to receive the instructions for ascertaining a plurality of messages based on the communications protocol.

10. The method of claim 9 wherein the processor controls an amplification level of the amplifier based on the instructions.

11. The method of claim 9 wherein the processor controls the switch routing the plurality of input signals from the input port to the output port.

12. The method of claim 8 further comprising the processor providing a control signal to the second amplifier, wherein the control signal determines the second output voltage.

13. The method of claim 9 further comprising the step of:
receiving a communications protocol selecting signal at the processor wherein the processor selects a set of instructions from memory associated with the communications protocol based on the communications protocol selecting signal.

14. An avionics data processing system comprising:
one or more dynamically reconfigurable electrical interface ("DREI") devices, wherein each DREI comprises:
a memory storing a plurality of instruction sets, wherein each instruction set is associated with one of a plurality of communications protocols;
a processor configured to:
    select one of the plurality of instruction sets, and
    generate a first numerical value so as to cause a particular output signal to be generated at an output interface of an DREI device;
a digital to analog converter ("DAC") configured to receive the first numerical value and generate a first intermediate output signal having a first voltage;
a first amplifier configured to receive the first intermediate output signal and generated a second intermediate output signal having a second voltage;
a first switch configured to receive the second intermediate output signal at a first input port of the first switch and provide the second intermediate output signal at a first output port of the first switch;
a signal conditioning path unit configured to receive the second intermediate output signal and generate the output signal;
a second switch configured to
    receive the output signal and provide the output signal on the output interface;
    receive an input signal at an input interface of the DREI device and provide the input signal to the signal conditioning path unit,
wherein the signal conditioning path unit is adapted to receive the input signal and provide a first intermediate input signal to the first switch, and
wherein the first switch is adapted to receive the first intermediate input signal at a second input port and provide the first intermediate input signal to an output port of the first switch;
a second amplifier configured to receive the first intermediate input signal and generated a second intermediate output signal; and
an analog to digital converter ("ADC") configured to receive the second intermediate input signal and to provide a second numerical value to the processor based on the second intermediate input signal.

15. The system of claim 14 wherein the processor is configured to provide an amplifier control signal that defines an amplification level for providing the second intermediate output signal.

16. The system of claim 15 wherein the amplification level is determined by a subset of instructions in the one of the plurality of instruction sets.

17. The system of claim 15 wherein the processor is configured to provide a switching control signal that selects the output port of the second switch.

18. The system of claim 17 further comprising a plurality of amplifiers configured to receive a plurality of numerical values associated with the plurality of communications protocols.

* * * * *